Patented Aug. 18, 1931

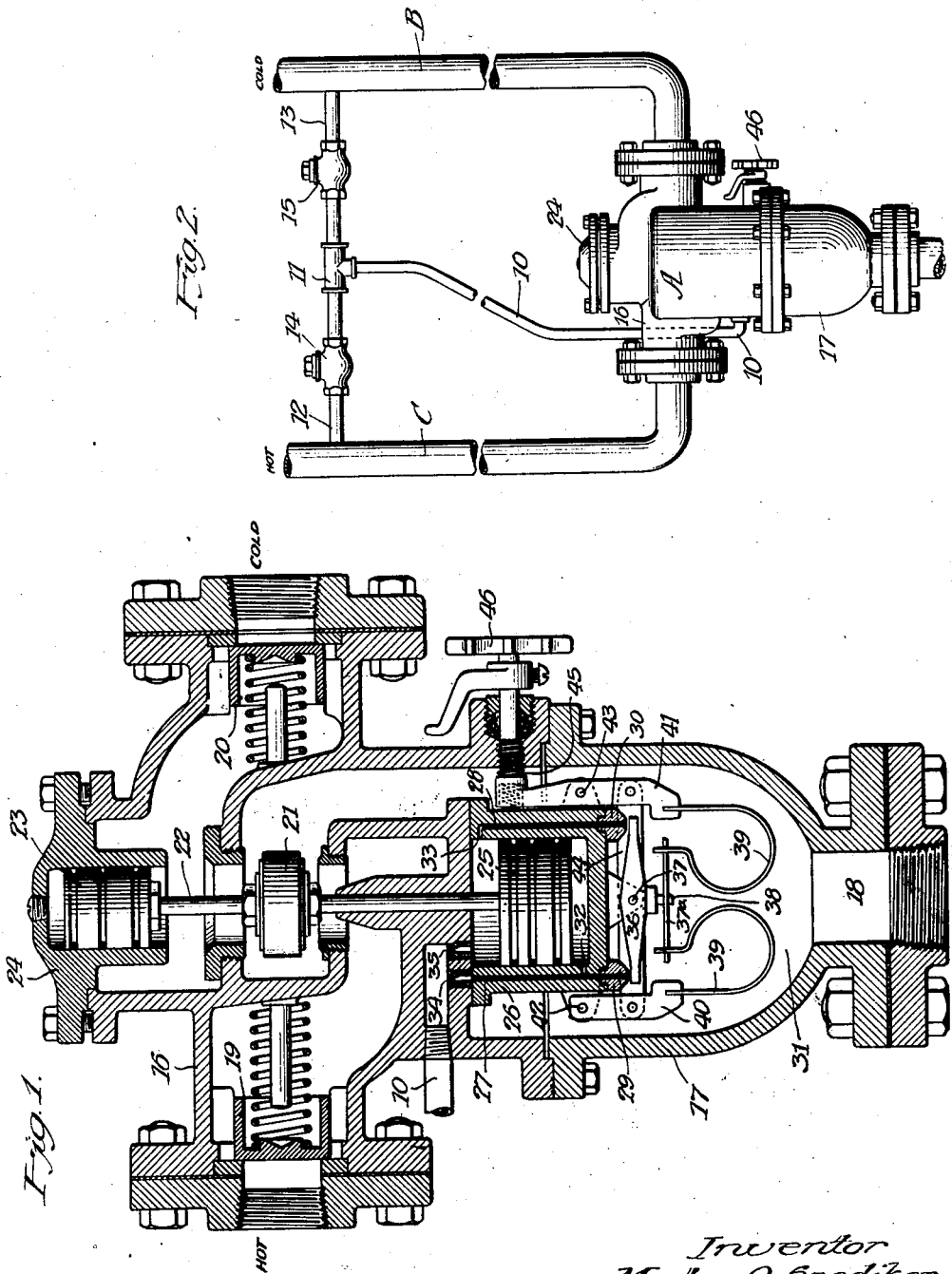

1,819,045

UNITED STATES PATENT OFFICE

MORTON O. SNEDIKER, OF CHICAGO, ILLINOIS, ASSIGNOR TO POWERS REGULATOR COMPANY, OF CHICAGO, ILLINOIS, A CORPORATION OF ILLINOIS

THERMOSTATIC WATER MIXER

Application filed July 26, 1929, Serial No. 381,283. Renewed January 30, 1931.

My invention relates to a water mixing device and particularly to a novel apparatus intended for use in laundries or other situations where a relatively large quantity of tempered water is delivered within a short time.

The objects of the invention are to provide a device of somewhat less expensive construction than those heretofore proposed, of large capacity, simple valve construction and a wide range of performance.

Many of the advantages in the device here disclosed arise from the fact that the well known vapor pressure thermostat is replaced by a simple pilot-operated thermostat. However, a novelty in pilot operation is introduced utilizing the highest of the pressures of the hot and cold fluid lines and connecting the pilot to those lines at a point considerably in advance of the connection into the water mixer. This insures more certain and reliable operation; this for the reason that within the mixer much of the pressure of the fluid is changed into velocity, whereas at a point in the supply lines considerably in advance of the mixer the pressure is substantially constant and somewhat higher than in the mixer.

The invention will be more readily understood by reference to the accompanying drawings, in which Fig. 1 is a vertical sectional view through a mixer constructed in accordance with my invention; and Fig. 2 is a side elevation showing, somewhat disgrammatically, the pipe arrangment.

In the drawings, and referring to Fig. 2, the mixer is indicated at A, the cold water supply pipe at B and the hot water pipe at C. A pilot pressure pipe 10 extends from the mixer to a T 11, and the pipes 12—13 extend from the T to the respective hot and cold supply lines. Check valves 14—15 are provided in the pipes 12—13 so that the higher of the pressures in the two lines will always be exerted in the pilot pipe.

The mixer comprises a casing composed of an upper part 16 and a lower part 17 suitably joined, the lower part having the mixed fluid outlet therein. Check valves 19—20 are provided in the inlet openings for the hot and cold fluids respectively. A mixing valve 21 is mounted to reciprocate between the inlet passages for the hot and cold fluids, the valve being mounted on a stem 22. The upper end of the stem carries a piston 23 that is loosely mounted in a cylinder formed in a cap 24, the piston acting as a dash-pot to prevent rapid movement of the valve. To the lower end of the stem 22 is connected a piston 25 fitted within a cylinder 26, the cylinder having passages 27—28 in its walls, both passages terminating in nozzles 29—30 that open into the mixing chamber 31. A lateral outlet 32 from the passage 27 provides entrance into the cylinder below the piston 25, while a lateral outlet 33 provides communication with the upper portion of the cylinder above the piston. The pipe 10 enters the casing and is in communication with the passage 27 through the port 34 and with the space above the piston through the port 35.

A rocker arm 36 is pivoted at 37 to ears formed on the cylinder 26, the two ends of the rocker serving to open or close the outlets 29—30 according to the position of the arm. The arm is oscillated through a cross piece 37a, connected to a pin 38 formed on the arm, the cross piece being actuated by two bi-metal thermostats 39. The arrangement of the bi-metal pieces is such that they work in unison; in other words, the brass and steel parts are reversed in the two elements so that they work in unison. The ends of the thermostats 39 are fixed in arms 40—41, the former being pivoted at 42 to an ear on the cylinder 26, while the latter is mounted for oscillation on a pivot 43. A link 44 connects the two arms and the opposite end of the arm 41 is engaged by a screw 45 operated by a hand-wheel 46 exterior of the casing. This is for the purpose of adjustment in order to secure any desired changes in temperature.

In operation, a supply of hot and cold fluids being present in the respective lines, the fluids in the mixer are passed around the valve 21 into the mixing chamber 31 where the temperature of the mixed liquids is effective on the bi-metal thermostats. If the liquid is too cold, the arm 36 will be oscillated to close the outlet 29 and to open the outlet 30. Immediately, the pressure delivered through the pilot pipe 10 will pass through the opening 34 and passages 27, 32 and begin to build up in the space beneath the piston 25 and cause it to rise. The liquid above the piston passes through the outlet 30 into the mixing chamber. This will tend to close the cold water inlet and increase the size of the hot water inlet around the valve 21. When the temperature of the water has sufficiently changed to cause a reversal of movement, the arm 36 will be shifted accordingly and a new adjustment of the valve will take place.

If for any reason the supply of either hot or cold fluid is discontinued, the check valves 19—20 will prevent reverse flow, and the thermostat will act to shut off the delivery of any fluid through the mixer, because pressure from the remaining supply will be effective through the pilot pipe 10 for the operation of the mixing valve.

The extreme simplicity of the mechanism and the absence of any parts that would tend to deterioration renders it peculiarly adaptable for the described use. The generous proportion of the ports and passages insures free delivery of fluids through the mixer and a sufficiently accurate control of temperature for practical purposes.

Obviously the construction is capable of much modification, and I do not wish to be limited except as indicated in the appended claims.

I claim:

1. In combination, a casing having a mixing valve and a piston for controlling the same, a thermostat in the outlet for mixed fluids, a pilot valve operated by said thermostat for controlling the admittance of fluids above and below said piston, and means for supplying fluid pressure under the control of said pilot valve from a point removed from the point of entrance of the fluid into said casing.

2. In a device of the class described the combination of a mixer, hot and cold supply lines thereto, a thermostat in said mixer, a pilot valve operated by said thermostat, a mixing valve in said mixer, and a pipe connected to a supply line at a point remote from its entrance into said mixer, said pipe supplying pressure controlled by said pilot valve, for moving said mixing valve.

3. In combination, a casing having a mixing valve and a mixing chamber, a piston for controlling the position of said mixing valve, a thermostat in the mixing chamber, a pipe for supplying fluid under pressure from a point remote from the casing, means providing passages for admitting said pressure above and below said piston, and a pilot valve operated by said thermostat for controlling the admittance of fluid above and below said piston.

4. In combination, a casing having hot and cold fluid inlets and a mixed fluid outlet, a mixing valve, a thermostat located in the casing adjacent to the outlet, pressure controlled means for operating said mixing valve, said means being shielded from the pressure within the casing, means for admitting fluid under pressure from a source remote from said casing to the space above and below said pressure controlled means, and a valve operated by said thermostat for admitting pressure to and exhausting the same from the spaces above and below said pressure controlled means.

5. In combination, a casing having hot and cold fluid inlets and a mixed fluid outlet, a mixing valve, a bi-metal thermostat located in the casing adjacent to the outlet, pressure controlled means for operating said mixing valve, said means being shielded from the pressure within the casing, means for admitting fluid under pressure from a source remote from said casing to the space above and below said pressure controlled means, and a valve operated by said thermostat for admitting pressure to and exhausting the same from the spaces above and below said pressure controlled means.

6. In combination, a casing having hot and cold fluid inlets and a mixed fluid outlet, a mixing valve, a bi-metal thermostat located in the casing adjacent to the outlet, a piston for moving said mixing valve, a pipe for supplying fluid under pressure from a point in a fluid supply line remote from the casing, means providing passages of restricted area connected to the spaces above and below said piston, means providing restricted outlet ports from said passages into the space within the casing, and a pilot valve operated by said thermostat for controlling said outlet ports.

7. In combination, a casing having hot and cold fluid inlets, a mixing fluid outlet and a mixing chamber, a mixing valve, a piston for moving said valve to vary the flow of the respective fluids, means for supplying fluid pressure at a higher pressure than that available in said casing, means for admitting said higher fluid pressure to the spaces above and below said piston, a thermostat within said mixing chamber, and a pilot valve operated by said thermostat for controlling the admission and discharge of said higher fluid pressure to the spaces above and below said piston.

8. In combination, a casing having hot and cold fluid inlets, a mixing fluid outlet and a mixing chamber, a mixing valve, a piston for moving said valve to vary the flow of the respective fluids, means for supplying fluid pressure at a higher pressure than that available in said casing, means for admitting said higher fluid pressure to the spaces above and below said piston, a bi-metal thermostat wholly contained within said mixing chamber, and a pilot valve operated by said thermostat for controlling the admission and discharge of said higher fluid pressure to the spaces above and below said piston.

9. In combination, a casing having hot and cold fluid inlets, a mixing fluid outlet and a mixing chamber, a mixing valve, a piston for moving said valve to vary the flow of the respective fluids, means for supplying fluid pressure at a higher pressure than that available in said casing, means for admitting said higher fluid pressure to the spaces above and below said piston, a pair of bimetal thermostats reversely arranged to operate in unison and mounted within said mixing chamber, and a pilot valve operated by said thermostatic elements for controlling the admission of said higher fluid pressure to the faces of said piston.

10. In combination, a casing having a mixing valve and a mixing chamber, hot and cold fluid supply pipes to said casing and piston for moving said mixing valve, a thermostat in the mixing chamber, a pipe for supplying fluid under pressure to the respective ends of said piston, means connecting said pipe to both said hot and cold supply pipes, and a pilot valve operated by said thermostat for controlling the admission and discharge of fluid under pressure to the space above and below said piston.

11. In combination, a casing having a mixing valve and a mixing chamber, hot and cold fluid supply pipes to said casing and piston for moving said mixing valve, a thermostat in the mixing chamber, a pipe for supplying fluid under pressure to the respective ends of said piston, means connecting said pipe to both said hot and cold supply pipes, and valves in said connecting means whereby said pipe receives the highest of the pressures in said hot and cold supply pipes.

In testimony whereof I have affixed my signature.

MORTON O. SNEDIKER.